United States Patent [19]

Begin et al.

[11] Patent Number: 5,258,707
[45] Date of Patent: Nov. 2, 1993

[54] METHOD OF NOISE REJECTION IN A MAGNETOSTRICTIVE POSITION DETECTOR INCLUDING DETERMINING A VALID TIME RANGE FOR PROPAGATION OF SONIC PULSES OVER A REFERENCE DISTANCE

[75] Inventors: John D. Begin; Richard D. Koski, both of Troy, Mich.

[73] Assignee: Magnetek, Inc., Clawson, Mich.

[21] Appl. No.: 915,548

[22] Filed: Jul. 20, 1992

[51] Int. Cl.⁵ .......................... G01B 7/14; G01F 23/30
[52] U.S. Cl. .............. 324/207.13; 73/290 V; 324/207.12; 324/207.24
[58] Field of Search ........... 324/207.12, 207.13, 324/207.17, 207.22, 207.24, 533; 73/290 V, 313, 314

[56] References Cited

U.S. PATENT DOCUMENTS

| | | |
|---|---|---|
| 4,158,964 | 6/1979 | McCrea et al. . |
| 4,305,283 | 12/1984 | Redding . |
| 4,510,587 | 4/1985 | Schneider ............... 324/207.12 X |
| 4,654,590 | 3/1987 | Kitaura et al. ............ 324/207.13 |
| 4,721,902 | 1/1988 | Tellerman . |
| 4,797,621 | 1/1989 | Anderson et al. ............... 324/533 |
| 4,839,590 | 6/1989 | Koski et al. ............ 324/207.13 X |
| 5,017,867 | 5/1991 | Dumais et al. . |

*Primary Examiner*—Gerard R. Strecker
*Attorney, Agent, or Firm*—Krass & Young

[57] ABSTRACT

A position detection probe having a magnetostrictive wire stretched between a head and a reflective foot end termination, and a magnet movable along the probe uses the sonic pulse propagation time from the magnet to the head as one parameter and the time from the magnet to the foot and reflected back to the head as another parameter for determining the magnet position. The sum of the propagation times is a constant which is used as a reference value. Upon receipt of the first two pulses the propagation times are summed and compared to the reference value, and the data is accepted if the sum is within a prescribed window around the reference value. When noise occurs, it creates a false measure of propagation time so that the sum of the propagation times is no longer equal to the reference value and the data is rejected.

4 Claims, 3 Drawing Sheets

METHOD OF NOISE REJECTION IN A MAGNETOSTRICTIVE POSITION DETECTOR INCLUDING DETERMINING A VALID TIME RANGE FOR PROPAGATION OF SONIC PULSES OVER A REFERENCE DISTANCE

FIELD OF THE INVENTION

This invention relates to a method of measuring position by a magnetostrictive position detector of the reflective type and particularly to such a method which immunizes the probe against noise.

BACKGROUND OF THE INVENTION

The usefulness of the phenomenon of magnetostrictivity in linear distance or position measuring devices is well documented in the prior art. The basic technology comprises a taut magnetostrictive wire supported usually in a tube, a magnet movable along the tube, a circuit for applying an electrical pulse to the wire, and a sensor at one end of the wire for sensing a sonic pulse emitted at the magnet due to an interaction between the magnetic field and the electrical pulse. A timing circuit measures the time between the electrical pulse and the sensed sonic pulse to determine the propagation time of the pulse which is proportional to the distance between the magnet and the sensor. A common problem in the implementation of such a device is that spurious signals due to electrical noise or mechanical shock imparted to the probe masquerade as sonic pulses and thus corrupt measurements of the true propagation time. The U.S. Pat. No. No. 4,721,902 to Tellerman et al entitled "Noise Reduction in a Sonic Transducer" discloses the basic type of position detector and further discusses the problem of noise. That patent proposes to reject such noise by generating an inhibit signal during much of the time between the excitation pulse and the receipt of the true sonic pulse so that any intervening noise will be ignored; generation of that inhibit signal requires an a priori knowledge of the approximate position of the movable magnet and a substantial margin to allow the movement of the magnet between measurements. It is desirable to have a noise rejection method which operates independently of the position of the movable magnet.

One improvement over the basic technology of particular interest is the increase in measurement resolution as set forth in the U.S. Pat. No. 5,017,867 to Dumais et al entitled "Magnetostrictive Linear Position Detector with Reflection Termination", which is incorporated herein by reference. According to that patent a magnetostrictive wire is stretched between a head and a reflective termination and a displaceable magnet is movably disposed along the wire in accordance with the position to be detected. The wire is excited by an electrical pulse which interacts with the field of the magnet to induce a torsional motion in the wire which propagates as a sonic pulse in one direction directly to the head and a pulse in the opposite direction to the termination where it is reflected to the head. A detector at the head senses the arrival times of the pulses which are spaced in time according to the position of the magnet and the propagation velocity along the wire. The difference of the arrival times and the known length of the wire are used to calculate the position of the magnet. Alternatively, the wire is excited by a sonic pulse at the head and an electrical pulse is induced by the magnet when the mechanical pulse reaches the magnet directly and again upon reflection. The timing of the electrical pulses is used to calculate the magnet position in the same way as the electrical excitation type of detector. The Dumais et al improvements are also vulnerable to noise in the system but they offer the basis of a solution: a fixed reference length along the wire which is useful as a test for signal validity. The known length of the wire itself is available to use as such a reference length.

Another related apparatus offering a known reference length is disclosed by McCrea et al U.S. Pat. No. 4,158,964 and Redding 4,305,283. Both of these patents disclose a magnetostrictive detector with top and bottom reference magnets in a tank to afford an approximately fixed reference, and an intermediate movable magnet. Sonic pulses from the magnet yield ratiometric time periods which are used to determine the position of the movable magnet. There is no teaching of noise rejection using such a probe.

SUMMARY OF THE INVENTION

It is therefore an object of the invention to provide a method of noise rejection for magnetostrictive position detectors. A further object is to provide such a method which is independent of the movable magnet position.

The invention is carried out in a linear magnetostrictive position detector having a magnetostrictive wire stretched between a head and a foot termination, a magnet movable along the wire, means for inducing sonic pulses traversing the wire, means for measuring the propagation times of the sonic pulses over a reference distance and as a function of the distance between the head and magnet, and circuit means responsive to at least one of the measured propagation times for determining the position of the magnet, wherein the detector is subject to noise giving rise to spurious signals, by the method of measuring the magnet position and rejecting spurious signals comprising the steps of: determining a valid time range for propagation over the reference distance;determining from the measured propagation times the measured time for the reference distance and a time related to the magnet position; comparing the measured time for the reference distance with the valid time range; and when the measured time is outside the valid time range, rejecting the time related to the magnet position.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
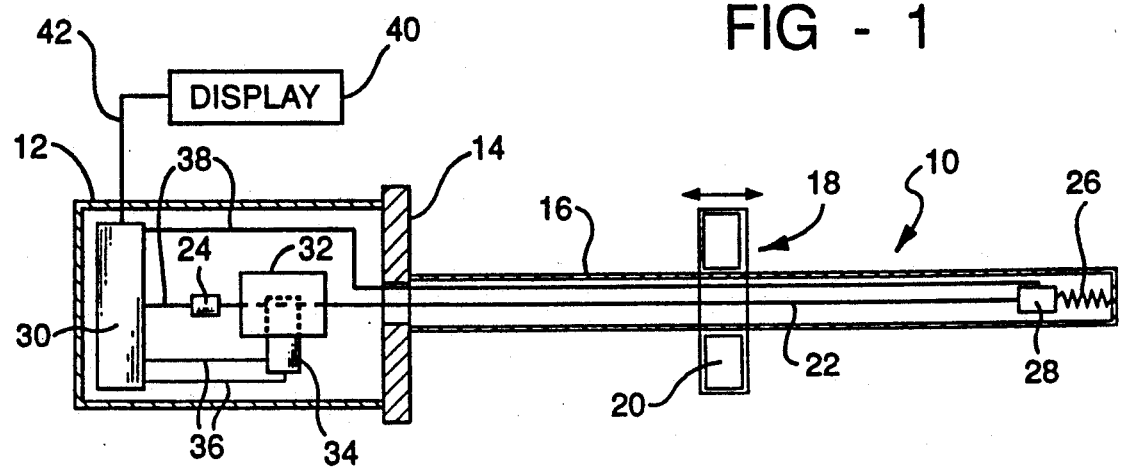
FIG. 1 is a cross-sectional view of a magnetostrictive used in carrying out the invention.

Referring to FIG. 1, a schematic diagram of a magnetostrictive linear position detector 10 shows a head 12 mounted on a base 14 and a tube 16 extending from the base, and a sliding collar 18 movably mounted on the tube 16 and containing a permanent magnet assembly 20, hereafter called a magnet 20. A magnetostrictive wire 22 preferably made of a nickel/iron alloy such as Nispan C is stretched along the center of the tube 16 and is held in the head at an anchor 24 which does not reflect sonic pulses in the wire. The wire 22 is held at its foot end in the end of the tube 16 by a spring 26 which applies a constant tension on the wire. A reflection collar 28 is secured to the wire 22 at the foot end and comprises a torus formed of a non-magnetic material such as brass and has a bore receiving the wire and a set screw to clamp the wire to the collar. The reflection collar 28 provides a mass discontinuity on the wire 22 which serves to reflect a sonic pulse arriving at the foot end of the wire back toward the head end.

The head 12 contains a signal processing circuit 30 and a transducer 32 which is well known in the art for sensing the arrival of a sonic pulse. The transducer 32 comprises a piezoelectric crystal 34 engaging the wire 22 and a pair of silicone rubber pads (not shown) engaging either side of the wire 22 and crystal 34. Electrodes on the crystal 34 are connected by leads 36 to the circuit 30. Torsional movement of the wire imparts a strain to the crystal 34 which produces a corresponding voltage pulse on the leads 36. Conversely, if a voltage is imposed on the crystal 34 by the leads 36 the crystal will impart a torsional pulse to the wire 22. The circuit 30 is connected by leads 38 to the head end and the foot end of the wire 22 to either impart an electrical pulse to the wire or to detect an electrical pulse in the wire. An external display 40 for showing measurement results is connected to the circuit 30 by a line 42.

Figure 2:
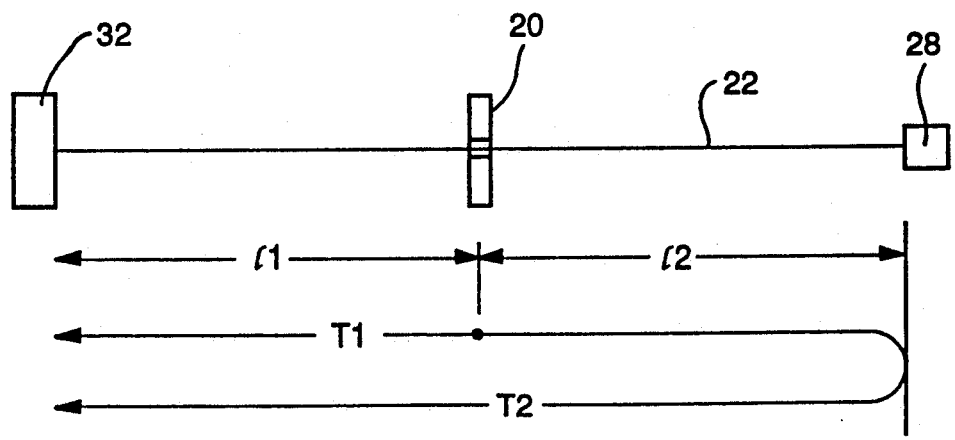
FIG. 2 is a diagram illustrating propagation times of sonic pulses in the probe of FIG. 1.

In general the probe 10 operates in either of two modes. In the first mode the probe is excited by applying an electrical pulse from the circuit 30 to the wire 22 and the field of the magnet 20 interacting with the electrical pulse causes a torsional motion in the wire. That torsional motion, herein called a sonic pulse, propagates in both directions along the wire at a temperature dependent velocity so that the one pulse reaches the transducer directly and a second pulse is first reflected from the collar 28 and then reaches the transducer, so that the transducer 32 produces two electrical pulses separated by a time interval. As illustrated in the schematic drawing of FIG. 2, the first pulse arrives at the head a time interval T1 after it is initiated, the time interval being proportional to the distance $l_1$ between the magnet 20 and the transducer 32. The second pulse arrives at the head a time interval T2 after initiation which is proportional to the distance $2l_2+l_1$, where $l_1$ is the distance between the magnet 20 and the reflective collar 28. The times T1 and T2 are processed by the circuit 30 to determine the position of the magnet. In the second mode of operation the probe is excited by energizing the transducer to apply a torsional motion to the head end of the wire 22 and the resultant sonic pulse travels to the magnet 20 first in a direct path and second after reflection from the collar 28. Each time the sonic pulse reaches the magnet an electrical pulse is induced in the wire 22 due to interaction with the magnetic field of the magnet. This results in two pulses reaching the circuit 30 via the leads 38 at time intervals T1 and T2 which are the same as those described above. Additional details on the construction and operation of such a transducer and the probe as a whole are given in the aforesaid U.S. Pat. No. 5,017,867 to Dumais et al. The circuit 30, however is different from that described in the patent.

Figure 1A:
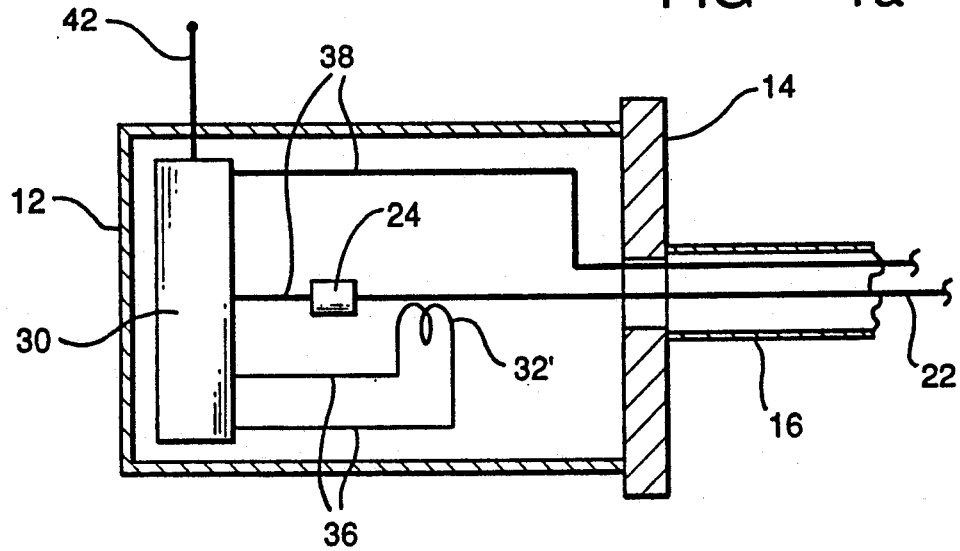
FIG. 1a is a partial view of a probe showing an alternative structure to the FIG. 1 probe.

FIG. 1a depicts an alternative probe which is the same as the probe of FIG. 1 except that a transducer coil 32' is used in place of the transducer 32. The coil 32' is sensitive to a magnetic pulse which accompanies the sonic pulse to produce an electrical pulse on lines 36 when a sonic pulse reaches the transducer location in the head. Thus the function of detecting a sonic pulse is equivalent to that of the transducer 32. However, the transducer coil 32' operates only in the first mode as described above.

Figure 3:
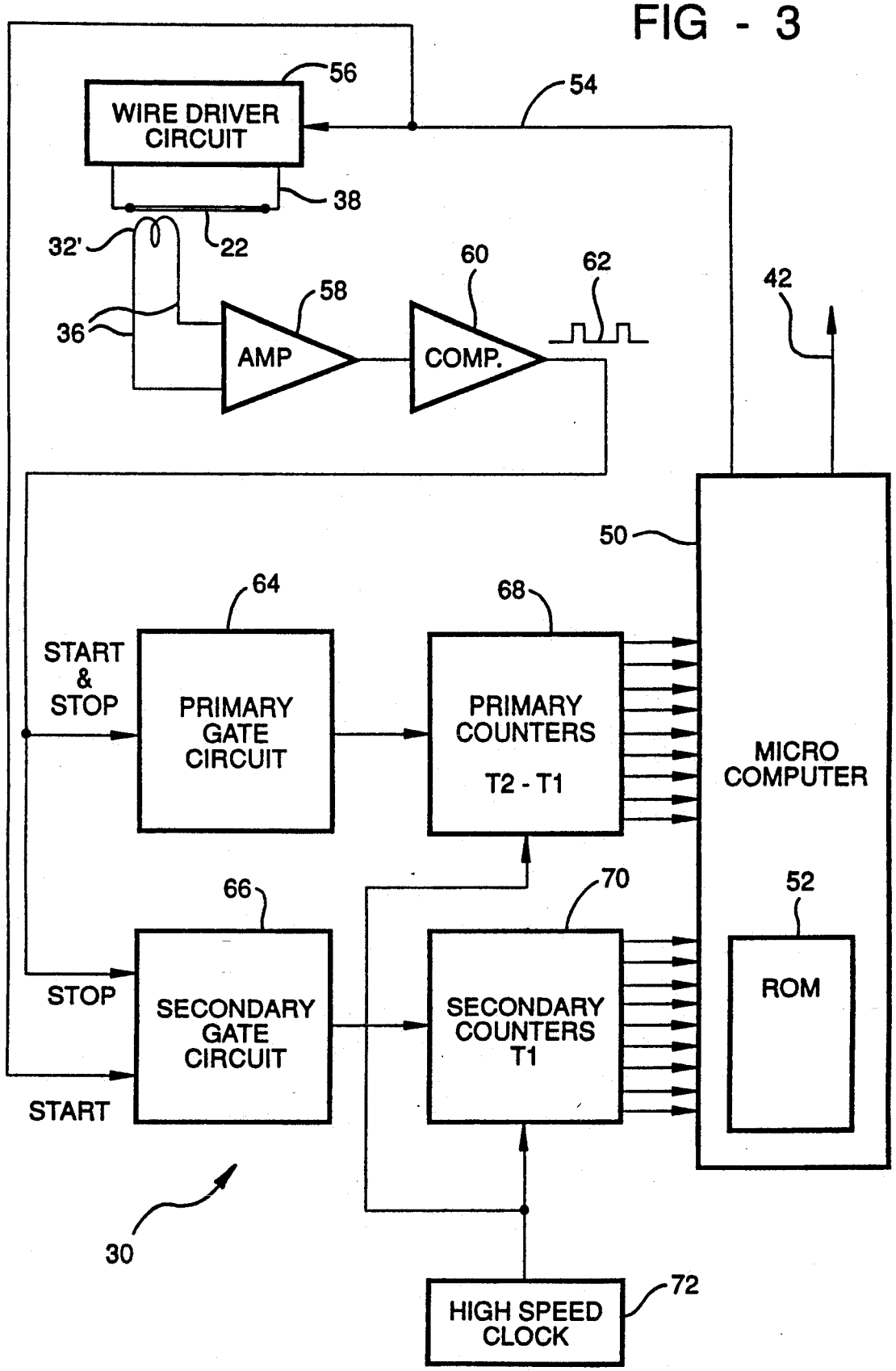
FIG. 3 is a schematic circuit diagram of the circuit of the probe of FIG. 1.

The circuit 30, as shown in FIG. 3, is configured to register time intervals T1 and T2−T1. The circuit 30 is based on a microcomputer 50 including a ROM 52 and which has an output to the display 40 on line 42 and an output line 54 to a driver circuit 56. The driver circuit is coupled via lines 38 to the wire 22 to supply periodic electrical excitation pulses to the wire when commanded by the computer 50. The transducer coil 32' (or transducer 32) which senses sonic pulses in the wire is coupled by the leads 36 to an amplifier 58 which feeds a comparator 60. The comparator issues return pulses 62 when the sonic pulses arrive at the head and produce signals which, when amplified, exceed a threshold set in the comparator. The comparator 60 output is coupled to the inputs of a primary gate circuit 64 and a secondary gate circuit 66. The computer output line 54 is also connected to an input of the secondary gate circuit 66. Primary and secondary counters 68 and 70, respectively, are coupled to a high speed clock 72 and are controlled by the respective gate circuits 64 and 66. The counters have digital outputs fed to the computer 50.

In operation, the computer 50 issues a series of trigger pulses to the driver 56, the pulses being spaced sufficiently to allow cessation of the sonic pulses in the wire resulting from an excitation pulse before applying the next excitation pulse. The two pulses 62 corresponding to the time T1 when the direct pulse reaches the head and the time T2 when the reflected pulse reaches the head cause the primary gate circuit to start and stop respectively so that the counter 68 counts the clock pulses during the period between the receipt of the T1 pulse and the T2 pulse, so that the final counter content will be proportional to the difference T2−T1. The secondary gate circuit 66 is started by each trigger pulse on line 54 and stopped by the T1 pulse, so that the counter content will be proportional to T1. It will be apparent that if a spurious pulse 62 occurs at the comparator output before the true pulse T2 is received, the incorrect data will be registered by the counters.

The sum S=T1+T2 of the propagation times is the time for the sonic pulse to propagate a distance of twice the length of the wire 22 or $2(l_1+l_2)$. For a given probe at a constant temperature the sum S is a constant for any position of the magnet. Temperature changes, however, affect both the propagation velocity and the length of the wire and thus effect the value of S. As will be seen, the method of noise rejection depends on having a fixed reference value but a window is provided so that small variances of the reference may occur without impairing the integrity of the system. Preferably the reference value is continually updated so that as wire length and propagation velocity slowly changes with temperature the reference value will change likewise.

Figure 4:
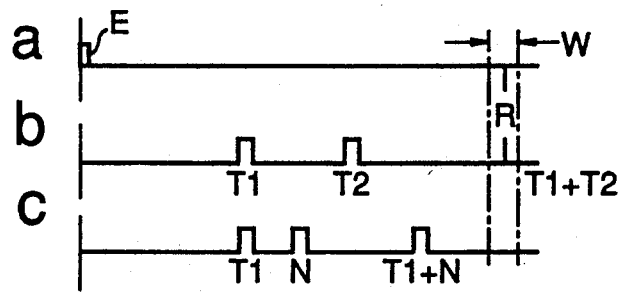
FIG. 4 is a timing diagram illustrating the noise rejection principle according to one embodiment of the invention.

The noise rejection method is based on the premise that the sum S=T1+T2 is a substantially constant value which can be established as a reference value R and that the first two pulses accepted by the circuit 30 are valid if they yield time values such that T1+T2 is substantially equal to the reference value. Stated inversely, if either of the first two pulses is due to noise, the sum T1+T2 will not be equal to the reference value R, and the data should be rejected. This is illustrated in FIG. 4 wherein line a shows an excitation pulse E applied to the wire and a window W centered at the known reference time R after the pulse E, line b shows T1 and T2 received by the circuit 30 and the calculated sum T1+T2 which falls within the reference window, and line c shows a case where the first two pulses are T1 and a noise pulse N, and the sum of those periods T1+N falls outside the reference window. Thus by using the sum of the first two pulse intervals as a validation parameter and comparing it with the known reference time interval, spurious pulses can be detected and rejected. In addition, the window W around the reference time R can be very small compared to the value of R so that the probability of spurious pulses yielding a time sum which fits in the window is extremely small. For example, a system using a 64 MHz clock will experience a propagation rate of about 600 counts per inch. For a 24 inch probe the sum T1+T2 will be 28,800 counts. The window should have a maximum size of 256 counts and is preferably smaller, say, 20 to 50 counts. Thus for a 50 count window, there is an extremely small probability that spurious counts can create a sum which fits into the window. If a spurious count does fit within the window, the resulting measurement error will be limited to a very small amount.

Figure 5:
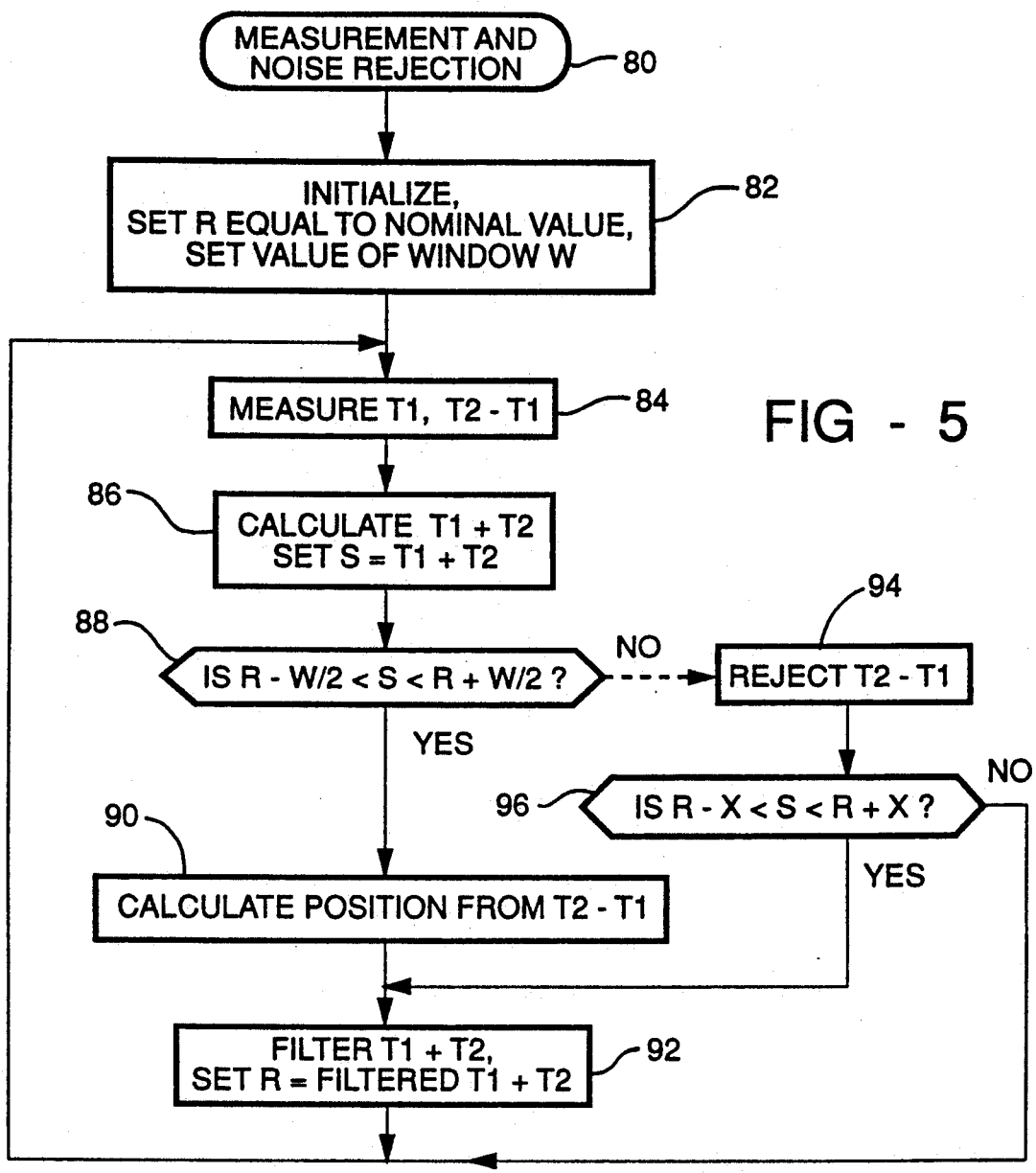
FIG. 5 is a flow chart illustrating the method of carrying out the invention.

The flow chart of FIG. 5 is a representation of a method which may be embodied in a program in the computer 50 to incorporate noise rejection in the measurement method. In this flow chart references to tasks which have been detailed in flow diagram function blocks are designated by <nn>, where nn is the block reference number. The method of measurement and noise rejection 80 involves initializing the program to set a reference value R which is equal to a nominal value of T1+T2 for the specific probe in use, and to set a value of the reference window W <82>. The probe is operated to measure T1 and T2−T1<84>, the sum T1+T2 is calculated and S is set equal to that sum <86>, and then the sum S is compared to the reference window which is set at R-W/2 at one side and R+W/2 at the other side. If the sum S is within the window W <88> the magnet position is calculated <90>, and the sum T1+T2 is filtered with other recent valid values of T1+T2 using a low pass digital filter, and R is set equal to the filtered value <92>. Then the measurement is repeated using the updated value of R for the reference time. In the event that the sum S is not within the window <88> the measured value of T2−T1 is rejected <94>. Then the sum S is compared <96> to another reference window between R-X and R+X which is larger than the window W and may be, for example, 256 counts; if S is within the window it is used to update the filtered T1+T2, even though the signal T2−T1 is rejected. If S is outside the large window the new value of S is ignored and the measurement is repeated.

Figure 6:
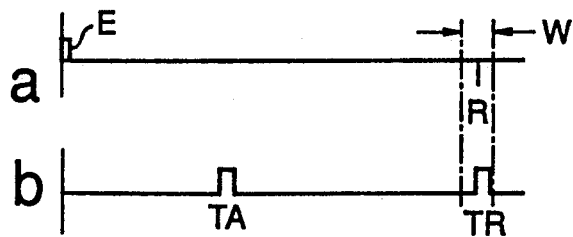
FIG. 6 is a pulse timing diagram illustrating another method of carrying out the invention.

Another embodiment incorporates a reference magnet at the foot end of the magnetostrictive wire instead of a reflective termination. In the absence of noise and as illustrated in FIG. 6, when the wire is excited a first pulse TA arrives at the head from the movable magnet and a second pulse TR arrives from the fixed reference magnet. The propagation time of the first pulse is proportional to the distance from the movable magnet to the head and the propagation time of the second pulse is a constant value R. When the second pulse occurs in a window around the constant value R the data TA is considered to be valid. In the case of an intervening noise pulse the second pulse will no longer occur in the window and the data will be rejected.

It will thus be apparent that the noise immunity methods described herein are effective to prevent false measurements due to noise and are easy to implement.

The embodiments of the invention in which an exclusive property or privilege is claimed are defined as follows:

1. In a linear magnetostrictive position detector having a magnetostrictive wire stretched between a head and a foot termination, a magnet movable along the wire, means for inducing sonic pulses traversing the wire, means for measuring the propagation times of the sonic pulses over a reference distance and as a function of the distance between the head and magnet, and circuit means responsive to at least one of the measured propagation times for determining the position of the magnet, wherein the detector is subject to noise giving rise to spurious signals; the method of measuring the magnet position and rejecting spurious signals comprising the steps of:

determining a valid time range for propagation over the reference distance;

determining from the measured propagation times the measured time for the reference distance and a time related to the magnet position;

comparing the measured time for the reference distance with the valid time range; and when the measured time is outside the valid time range, rejecting the time related to the magnet position.

2. The invention as defined in claim 1 wherein the step of determining a valid time range comprises measuring a plurality of propagation times for the reference distance;

low pass filtering the said plurality of propagation times to establish a filtered value; and appending a window value to the filtered value to determine the valid time range.

3. The invention as defined in claim 2 wherein the step of low pass filtering includes periodically updating the filtered value to accommodate small changes in the reference distance.

4. In a linear magnetostrictive position detector having a magnetostrictive wire stretched between a head and a foot termination, a magnet movable along the wire, means for inducing sonic pulses in the wire traversing the length of the wire, means for measuring the propagation times of the sonic pulses as functions of the magnet position and of the length of the wire, and circuit means responsive to the measured propagation times of the pulses for determining the position of the magnet; the method of measuring the magnet position and rejecting spurious signals comprising the steps of:

determining a valid time range for propagation over the length of the wire;

determining from the measured propagation times the measured time for the length of the wire and a time related to the magnet position;

comparing the measured time for the length of the wire with the valid time range; and when the measured time is within the valid time range, calculating the magnet position from the time related to the magnet position.

* * * * *